United States Patent [19]

Schwarz et al.

[11] Patent Number: 5,583,171
[45] Date of Patent: Dec. 10, 1996

[54] MICROPOROUS MATERIAL EXHIBITING LOW ALKALI METAL CONTENT

[75] Inventors: Richard A. Schwarz, Akron; Paul L. Benenati, Wadsworth, both of Ohio; Michael H. McGarry, Wexford, Pa.

[73] Assignee: PPG Industries, Inc., Pittsburgh, Pa.

[21] Appl. No.: 221,203

[22] Filed: Mar. 31, 1994

[51] Int. Cl.$^6$ ............................................. C08J 3/07
[52] U.S. Cl. ........................ 524/261; 524/264; 524/266; 524/280; 428/315.5; 428/317.9; 428/318.4; 428/319.7; 428/331; 156/409; 156/400; 156/401
[58] Field of Search ...................... 524/261, 264, 524/266, 280; 428/315.5, 317.9, 318.4, 319.7, 319.9, 331; 106/409, 400, 401

[56] References Cited

U.S. PATENT DOCUMENTS

| | | | |
|---|---|---|---|
| 3,351,495 | 11/1967 | Bowle et al. | 136/146 |
| 4,463,108 | 7/1984 | Wagner et al. | 523/216 |
| 4,861,644 | 8/1989 | Young et al. | 428/195 |
| 4,927,802 | 5/1990 | Leatherman | 503/214 |
| 5,047,283 | 9/1991 | Leatherman | 428/209 |
| 5,196,202 | 3/1993 | Schwarz | 428/315.5 |
| 5,256,386 | 10/1993 | Nystrom et al. | 423/338 |
| 5,326,391 | 7/1994 | Anderson et al. | 428/317.9 |

FOREIGN PATENT DOCUMENTS

| | | |
|---|---|---|
| 1044028 | 7/1963 | United Kingdom . |
| 1044502 | 3/1965 | United Kingdom . |
| 1044503 | 3/1965 | United Kingdom . |

*Primary Examiner*—James J. Seidleck
*Assistant Examiner*—Duc Troung
*Attorney, Agent, or Firm*—George D. Morris

[57] ABSTRACT

Microporous material comprising water insoluble thermoplastic organic polymer and particulate amorphous precipitated silica not only exhibits low particulate emissions during handling and use, but also has a low extactable alkali metal content. Microporous material having these characteristics is especially useful in clean rooms where electronic devices such as integrated circuits are manufactured. Such microporous material may be produced by employing amorphous precipitated silica particles having low alkali metal content as all or a substantial proportion of the amorphous precipitated silica particles constituting the microporous material.

17 Claims, No Drawings

MICROPOROUS MATERIAL EXHIBITING LOW ALKALI METAL CONTENT

Electronic devices such as integrated circuits are necessarily manufactured in environments having very low levels of particulates. Such manufacture is therefore conducted in what have come to be known as clean rooms which, by industrial definition, are rooms where particulates are controlled.

Documents and papers used in clean rooms should not contribute to the particulate load by loss of particles from the document during handling and use of the document. Ordinary paper readily releases fibers into the air during handling and is not well suited for use in clean rooms.

Microporous materials comprising thermoplastic organic polymer, large proportions of amorphous precipitated silica particles, and large void volumes are known and have many valuable properties. Such microporous materials are durable and many of them are particularly useful as writing and printing substrates. They show low particulate emissions during handling, have excellent ink adhesion, are compatible with a wide range of printing processes, and are easily written upon using ball-point pens, felt-tip pens, and fountain pens.

Amorphous precipitated silica is used in microporous materials because of its physical and chemical properties, its compatibility with the other components of the microporous material, its compatibility with the processes by which microporous materials are made, its availability, and its reasonable cost. Amorphous precipitated silicas are produced by acidifying an aqueous solution of a soluble alkali metal silicate, typically sodium silicate or potassium silicate, with acid. The acid employed is generally a strong mineral acid such as sulfuric acid or hydrochloric acid although carbon dioxide is sometimes used. Amorphous precipitated silicas used in the preparation of microporous materials typically have alkali metal contents of from 30 to 600 millimoles/kilogram of silica as determined by X-ray fluorescence spectroscopy. Some of the alkali metal is present as sulfate, chloride, or carbonate salts which result from the acidification of the alkali metal silicate with the corresponding acid. Salts of these types are sources of extractable alkali metal ions. A portion of the alkali metal is present as silicate or aluminosilicate salts which form part of the precipitated silica structure. Alkali metal atoms bound in this way are of no concern so long as they are not extractable as ions. However under some conditions the unextractable alkali metal atoms can be converted to extractable ions.

Alkali metal ions are particularly damaging to unprotected electronic devices such as integrated circuits, components such as silicon wafers, and the microcircuitries of computer chips. In clean room environments all materials which may come into contact with the unprotected, i.e., unpackaged, integrated circuits or their components should be substantially free of mobile alkali metal ion contamination.

Microporous material comprising water insoluble thermoplastic organic polymer and particulate amorphous precipitated silica has now been discovered which not only exhibits low particulate emissions during handling and use, but also has a low extractable alkali metal content. Accordingly, in microporous material which on a coating-free, printing ink-free, impregnant-free basis and pre-bonding basis comprises: (a) a matrix consisting essentially of substantially water insoluble thermoplastic organic polymer, (b) finely divided substantially water-insoluble filler particles, of which at least 50 percent by weight are amorphous precipitated silica particles, the filler particles being distributed throughout the matrix and constituting from 40 to 90 percent by weight of the microporous material, and (c) a network of interconnecting pores communicating substantially throughout the microporous material, the pores constituting from 35 to 95 percent by volume of the microporous material, one embodiment of the invention is the improvement wherein the microporous material is characterized by an extractable alkali metal content of less than 50 millimoles per kilogram of the microporous material. Often the microporous material is characterized by an extractable alkali metal content of less than 35 millimoles per kilogram of the microporous material. Frequently, the microporous material is characterized by an extractable alkali metal content of less than 20 millimoles per kilogram of the microporous material.

As used herein and in the claims, the extractable alkali metal content of the microporous material is determined by adding 0.5 Normal nitric acid to a weighed sample of the microporous material in sufficient quantity to wet the sample with a surfeit of the liquid. This is accomplished in a 100 milliliter centrifuge tube using 50 milliliters of the 0.5 Normal nitric acid. The sample and liquid are agitated with a stirring rod for several minutes and then the tube and its contents are centrifuged to produce a clear solution. The solution is then analyzed for alkali metal ions (especially sodium ions) using atomic adsorption spectroscopy according to the procedures supplied with the particular instrument. Owing to the extreme sensitivity of atomic adsorption spectroscopy, dilution of the solution prior to analysis will probably be required.

Microporous material having low extractable alkali metal content may be produced by employing amorphous precipitated silica having low extractable alkali metal content as all or a substantial proportion of the amorphous precipitated silica constituting the microporous material. Therefore, in microporous material which on a coating-free, printing ink-free, impregnant-free basis and pre-bonding basis comprises: (a) a matrix consisting essentially of substantially water insoluble thermoplastic organic polymer, (b) finely divided substantially water-insoluble filler particles, of which at least 50 percent by weight are amorphous precipitated silica particles, the filler particles being distributed throughout the matrix and constituting from 40 to 90 percent by weight of the microporous material, and (c) a network of interconnecting pores communicating substantially throughout the microporous material, the pores constituting from 35 to 95 percent by volume of the microporous material, the invention is the improvement wherein the amorphous precipitated silica particles are characterized by an alkali metal content of less than 80 millimoles per kilogram of the silica particles.

As used herein and in the claims, alkali metal content of the amorphous precipitated silica is determined by X-ray fluorescence spectroscopy.

Many microporous materials based on water insoluble thermoplastic organic polymer and particulate filler are known. Examples of such microporous materials, processes for making such microporous materials, and their properties are described in U.S. Pat. Nos. 2,772,322; 3,351,495; 3,696,061; 3,725,520; 3,862,030; 3,903,234; 3,967,978; 4,024,323; 4,102,746; 4,169,014; 4,210,709; 4,226,926; 4,237,083; 4,335,193; 4,350,655; 4,472,328; 4,585,604; 4,613,643; 4,681,750; 4,791,144; 4,833,172; 4,861,644; 4,892,779; 4,927,802; 4,872,779; 4,927,802; 4,937,115; 4,957,787; 4,959,208; 5,032,450; 5,035,886; 5,071,645; 5,047,283; and 5,114,438, in U.S. patent application Ser. No. 07/596,175, filed Oct. 10, 1990, and in International Publication No. WO 92/06577. The processes for making the known microporous materials may be modified by using amorphous precipitated silica having a low extractable alkali metal content as all or a substantial proportion of the filler used to form the microporous material in accordance with the teachings of the present invention.

The matrix of the microporous material consists essentially of substantially water-insoluble thermoplastic organic polymer. The numbers and kinds of such polymers suitable for use of the matrix are enormous. In general, substantially any substantially water-insoluble thermoplastic organic polymer which can be extruded, calendered, pressed, or rolled into film, sheet, strip, or web may be used. The polymer may be a single polymer or it may be a mixture of polymers. The polymers may be homopolymers, copolymers, random copolymers, block copolymers, graft copolymers, atactic polymers, isotactic polymers, syndiotactic polymers, linear polymers, or branched polymers. When mixtures of polymers are used, the mixture may be homogeneous or it may comprise two or more polymeric phases. Examples of classes of suitable substantially water-insoluble thermoplastic organic polymers include the thermoplastic polyolefins, poly(halo-substituted olefins), polyesters, polyamides, polyurethanes, polyureas, poly(vinyl halides), poly(vinylidene halides), polystyrenes, poly(vinyl esters), polycarbonates, polyethers, polysulfides, polyimides, polysilanes, polysiloxanes, polycaprolactones, polyacrylates, and polymethacrylates. Hybrid classes exemplified by the thermoplastic poly(urethane-ureas), poly(ester-amides), poly(silane-siloxanes), and poly(ether-esters) are within contemplation. Examples of suitable substantially water-insoluble thermoplastic organic polymers include thermoplastic high density polyethylene, low density polyethylene, ultrahigh molecular weight polyethylene, polypropylene (atactic, isotactic, or syndiotatic as the case may be), poly(vinyl chloride), polytetrafluoroethylene, poly(vinylidene chloride), copolymers of vinylidene chloride and vinyl acetate, copolymers of vinylidene chloride and vinyl chloride, copolymers of ethylene and propylene, copolymers of ethylene and butene, poly(vinyl acetate), polystyrene, poly(omega-aminoundecanoic acid) poly(hexamethylene adipamide), poly(epsilon-caprolactam), and poly(methyl methacrylate). These listings are by no means exhaustive, but are intended for purposes of illustration. The preferred substantially water-insoluble thermoplastic organic polymers comprise poly(vinyl chloride), copolymers of vinyl chloride, or mixtures thereof; or they comprise substantially linear ultrahigh molecular weight polyolefin which is substantially linear ultrahigh molecular weight polyethylene having an intrinsic viscosity of at least 10 deciliters/gram, substantially linear ultrahigh molecular weight polypropylene having an intrinsic viscosity of at least 6 deciliters/gram, or a mixture thereof. Substantially linear ultrahigh molecular weight polyethylene having an intrinsic viscosity of at least 18 deciliters/gram is especially preferred.

Inasmuch as ultrahigh molecular weight (UHMW) polyolefin is not a thermoset polymer having an infinite molecular weight, it is technically classified as a thermoplastic. However, because the molecules are substantially very long chains, UHMW polyolefin, and especially UHMW polyethylene, softens when heated but does not flow as a molten liquid in a normal thermoplastic manner. The very long chains and the peculiar properties they provide to UHMW polyolefin are believed to contribute in large measure to the desirable properties of microporous materials made using this polymer.

As indicated earlier, the intrinsic viscosity of the UHMW polyethylene is at least 10 deciliters/gram. Usually the intrinsic viscosity is at least 14 deciliters/gram. Often the intrinsic viscosity is at least 18 deciliters/gram. In many cases the intrinsic viscosity is at least 19 deciliters/gram. Although there is no particular restriction on the upper limit of the intrinsic viscosity, the intrinsic viscosity is frequently in the range of from 10 to 39 deciliters/gram. The intrinsic viscosity is often in the range of from 14 to 39 deciliters/gram. In most cases the intrinsic viscosity is in the range of from 18 to 39 deciliters/gram. An intrinsic viscosity in the range of from 18 to 32 deciliters/gram is preferred.

Also as indicated earlier the intrinsic viscosity of the UHMW polypropylene is at least 6 deciliters/gram. In many cases the intrinsic viscosity is at least 7 deciliters/gram. Although there is no particular restriction on the upper limit of the intrinsic viscosity, the intrinsic viscosity is often in the range of from 6 to 18 deciliters/gram. An intrinsic viscosity in the range of from 7 to 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert- butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer according to the equation:

$$M = 5.37 \times 10^4 [\eta]^{1.37}$$

where M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the equation:

$$M = 8.88 \times 10^4 [\eta]^{1.25}$$

where M is the nominal molecular weight and $[\eta]$ is the intrinsic viscosity of the UHMW polypropylene expressed in deciliters/gram.

The substantially linear ultrahigh molecular weight polypropylene is most frequently substantially linear ultrahigh molecular weight isotactic polypropylene. Often the degree of isotacicity of such polymer is at least 95 percent, while preferably it is at least 98 percent.

When used, sufficient UHMW polyolefin should be present in the matrix to provide its properties to the microporous material. Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. For this reason, the preferred other thermoplastic organic polymers which may optionally be present are low density polyethylene, high density polyethylene, poly(tetrafluoroethylene), and polypropylene. It is our experience that usually at least about one percent UHMW polyolefin, based on the weight of the matrix, will provide the desired properties to the microporous material. At least 3 percent UHMW polyolefin by weight of the matrix is commonly used. In many cases at least 10 percent by weight of the matrix is UHMW polyolefin. Frequently at least 50 percent by weight of the matrix is UHMW polyolefin. In many instances at least 60 percent by weight of the matrix is UHMW polyolefin. Sometimes at least 70 percent by weight of the matrix is UHMW polyolefin. In some cases the other thermoplastic organic polymer is substantially absent.

In a preferred embodiment the matrix comprises a mixture of substantially linear ultrahigh molecular weight polyethylene having an intrinsic viscosity of at least 10 deciliters/ gram and lower molecular weight polyethylene having an ASTM D 1238-86 Condition E melt index of less than 50 grams/10 minutes and an ASTM D 1238-86 Condition F melt index of at least 0.1 gram/10 minutes. The nominal molecular weight of the lower molecular weight polyethylene (LMWPE) is lower than that of the UHMW polyethylene. LMWPE is thermoplastic and many different types are known. One method of classification is by density, expressed in grams/cubic centimeter and rounded to the nearest thousandth, in accordance with ASTM D 1248-84 (Reapproved 1989):

TABLE 1

| Type | Abbreviation | Density, g/cm³ |
| --- | --- | --- |
| Low Density Polyethylene | LDPE | 0.910–0.925 |
| Medium Density Polyethylene | MDPE | 0.926–0.940 |
| High Density Polyethylene | HDPE | 0.941–0.965 |

Any or all of these polyethylenes may be used as the LMWPE in the present invention. HDPE, however, is preferred because it ordinarily tends to be more linear than MDPE or LDPE.

The ASTM D 1238-86 Condition E (that is, 190° C. and 2.16 kilogram load) melt index of the LMWPE is less than 50 grams/10 minutes. Often the Condition E melt index is less than 25 grams/10 minutes. Preferably the Condition E melt index is less than 15 grams/10 minutes.

The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes. Preferably the Condition F melt index is at least 1.0 gram/10 minutes.

It is especially preferred that the UHMW polyethylene constitute at least one percent by weight of the matrix and that the UHMW polyethylene and the LMWPE together constitute substantially 100 percent by weight of the polymer of the matrix.

Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is substantially no difference in density between the gel phase and the surrounding liquid phase while the viscosity is low, the gel phase does not settle out, that is to say, it does not precipitate. Silica gel, then, may be described as a nonprecipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate or potassium silicate, and an acid so that colloidal particles will grow in weakly alkaline solution and be coagulated by the alkali metal ions of the resulting soluble alkali metal salt. Various acids may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Amorphous precipitated silica is usually obtained by precipitation from an aqueous solution of alkali metal silicate such as sodium silicate or potassium silicate using a suitable acid such as sulfuric acid, hydrochloric acid, or carbon dioxide. Following precipitation, the precipitated silica is usually washed and then dried. Washing to such an extent as would reduce the alkali metal content of the dried product to less than 60 millimoles per kilogram has been seldom practiced because of the substantial added expense and the absence of a real need for such products in most industrial applications. Exemplary processes for producing conventional amorphous precipitated silicas are described in detail in U.S. Pat. Nos. 2,657,149; 2,940,830; 4,681,750 and 5,094,829. The amorphous precipitated silica employed in the present invention can be prepared by thoroughly washing the precipitated silica after precipitation in the conventional manner, but before drying. The washing is more thorough than that used in the usual processes for making amorphous precipitated silica. The washing is usually performed either continuously using fresh water or batchwise in a number of wash-and-drain cycles using fresh water. The reduction of extractable alkali metal to low levels is more effectively achieved if the water used for washing is either deionized water or distilled water. A lower pH during the final stage of precipitation will also tend to drive neutralization of the alkali metal silicate to a higher degree of completion and reduce the alkali metal ion content of the silica.

The amorphous precipitated silica particles used in the present invention are characterized by an alkali metal content of less than 80 millimoles per kilogram of the silica. Often they are characterized by an alkali metal content of less than 70 millimoles per kilogram of the silica. Preferably they are characterized by an alkali metal content of less than 60 millimoles per kilogram of the silica. In most instances all of the amorphous precipitated silica particles used in the present invention have the requisite low alkali metal content. Nevertheless, mixtures of different amorphous precipitated silica particles, some having low alkali metal content and some having higher alkali metal content, may be used if the mixture has the requisite low alkali metal content.

Amorphous precipitated silica particles which have the requisite low alkali metal content and which may be used in the present invention are themselves well known. Examples of such particles include Hi-Sil® 927 precipitated silica and Hi-Sil® 928 precipitated silica from PPG Industries, Inc.

As present in the microporous material, the amorphous precipitated silica particles may be in the form of ultimate particles, aggregates of ultimate particles, or a combination of both. The size and distribution of sizes of aggregates of a particular precipitated silica will depend on the process of drying and the degree of milling, if any, given to the dried silica. In most cases, at least 90 percent by weight of the amorphous precipitated silica particles used in preparing the microporous material have gross particle sizes in the range of from 5 to 150 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Preferably at least 90 percent by weight of the amorphous precipitated silica particles have gross particle sizes in the range of from 10 to 120 micrometers. It is expected that the sizes of amorphous precipitated silica agglomerates may be reduced during processing of the ingredients to prepare the microporous material. Accordingly, the distribution of gross particle sizes in the microporous material may be smaller than in the raw amorphous precipitated silica particles themselves. The amorphous precipitated silica preferred for use in the invention is spray dried and either unmilled or lightly milled.

The average ultimate particle size of the amorphous precipitated silica (irrespective of whether or not the ultimate particles are agglomerated) is usually less than 0.1 micrometer as determined by transmission electron microscopy. Often the average ultimate particle size is less than 0.05 micrometer. Preferably the average ultimate particle size of the precipitated silica is less than 0.03 micrometer.

In most instances the amorphous precipitated silica particles constitute all of the finely divided substantially water-insoluble filler particles of the microporous material. Other finely divided substantially water-insoluble filler particles, however, may also be employed. When used, they should be chosen so that their identities and quantities do not provided an unacceptably high extractable alkali metal content to the microprous material. Amorphous precipitated silica particles constitute at least 50 percent by weight of the finely divided substantially water-insoluble filler particles. In many cases amorphous precipitated silica particles constitute at least 65 percent by weight of the finely divided substantially water-insoluble filler particles. Often amorphous precipitated silica particles constitute at least 75 percent by weight of the finely divided substantially water-insoluble filler particles. Frequently amorphous precipitated silica particles constitute at least 85 percent by weight of the finely divided substantially water-insoluble filler particles. Usually all of the finely divided substantially water-insoluble filler particles are amorphous precipitated silica particles.

Examples of other finely divided substantially water-insoluble filler particles that can be used in addition to the amorphous precipitated silica particles include other siliceous particles such as particles of quartz, silica gel, fumed silica, mica, montmorillonite, kaolinire, asbestos, talc, diatomaceous earth, vermiculite, natural and synthetic zeolites, cement, calcium silicate, aluminum silicate, aluminum polysilicate, alumina silica gels, and glass particles. Other examples include particles of finely divided substantially water-insoluble non-siliceous filler particles such as particles of titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide. The preferred other fillers are those which do not significantly add to the extractable alkali metal content of the microporous material. In most instances such preferred other fillers have low alkali metal contents.

The finely divided substantially water-insoluble filler particles constitute from 40 to 90 percent by weight of the microporous material. Frequently such filler particles constitute from 40 to 85 percent by weight of the microporous material. Often the finely divided substantially water-insoluble filler particles constitute from 50 to 90 percent by weight of the microporous material. In many cases the finely divided substantially water-insoluble filler particles constitute from 50 to 85 percent by weight of the microporous material. From 55 percent to 80 percent by weight is preferred.

Minor amounts, usually less than 5 percent by weight, of other materials used in processing such as lubricant, processing plasticizer, organic extraction liquid, water, and the like, may optionally also be present. Yet other materials introduced for particular purposes may optionally be present in the microporous material in small amounts, usually less than 15 percent by weight. Examples of such materials include antioxidants, ultraviolet light absorbers, reinforcing fibers such as chopped glass fiber strand, dyes, pigments, and the like. Materials exemplified by the foregoing types may collectively be regarded as additives. Preferred additives are those which do not significantly add to the extractable alkali metal content of the microporous material. In most cases such preferred additives have low alkali metal contents. The balance of the microporous material, exclusive of filler and any coating, printing ink, or impregnant applied for one or more special purposes is substantially the thermoplastic organic polymer.

On a coating-free, printing ink free, impregnant-free, and pre-bonding basis, pores constitute from 35 to 80 percent by volume of the microporous material. In many cases the pores constitute from 60 to 75 percent by volume of the microporous material. As used herein and in the claims, the porosity (also known as void volume) of the microporous material, expressed as percent by volume, is determined according to the equation:

$$\text{Porosity} = 100[1 - d_1/d_2]$$

where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left[\frac{v_1 r_1}{w_1} + \frac{v_2 r_2}{w_2}\right] \Big/ \left[\frac{v_1}{w_1} + \frac{v_2}{w_2}\right]$$

where $d$ is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally on a coating-free, printing ink-free, impregnant-free, and pre-bonding basis the volume average diameter of the pores is in the range of from 0.02 to 0.5 micrometer. Very often the volume average diameter of the pores is in the range of from 0.04 to 0.3 micrometer. From 0.05 to 0.25 micrometer is preferred.

In the course of determining the volume average pore diameter by the above procedure, the maximum pore radius detected is sometimes noted. This is taken from the low pressure range scan if run; otherwise it is taken from the high pressure range scan. The maximum pore diameter is twice the maximum pore radius.

Inasmuch as some coating processes, printing processes, impregnation processes and bonding processes result in filling at least some of the pores of the microporous material and since some of these processes irreversibly compress the microporous material, the parameters in respect of porosity, volume average diameter of the pores, and maximum pore diameter are determined for the microporous material prior to application of one or more of these processes.

Many processes are known for producing the microporous materials which may be employed in the present invention. Such processes are exemplified by those described in the patents, patent application, and international patent publication earlier referenced.

Preferably filler particles, thermoplastic organic polymer powder, processing plasticizer and minor amounts of lubricant and antioxidant are mixed until a substantially uniform mixture is obtained. The weight ratio of filler to polymer employed in forming the mixture is substantially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is microporous material, is passed to a take-up roll.

The processing plasticizer has little solvating effect on the thermoplastic organic polymer at 60° C., only a moderate solvating effect at elevated temperatures on the order of 100° C., and a significant solvating effect at elevated temperatures on the order of 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are oils which have a pour point of less than 22° C. according to ASTM D 97-66 (reapproved 1978). Particularly preferred are oils having a pour point of less than 10° C. Examples of suitable oils include Shellflex® 412 and Shellflex® 371 oil (Shell Oil Co.) which are solvent refined and hydrotreated oils derived from naphthenic crude. Further examples of suitable oils include ARCOprime® 400 oil (Atlantic Richfield Co.) and Kaydol® oil (Witco Corp.) which are white mineral oils. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

In the above described process for producing microporous material, extrusion and calendering are facilitated when the substantially water-insoluble filler particles carry much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of at least the siliceous filler particles is in the range of from 20 to 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from 25 to 350 square meters per gram. Preferably, but not necessarily, the surface area of any non-siliceous filler particles used is also in at least one of these ranges.

Inasmuch as it is desirable to substantially retain the filler in the microporous material, it is preferred that the substantially water-insoluble filler particles be substantially insoluble in the processing plasticizer and substantially insoluble in the organic extraction liquid when microporous material is produced by the above process.

The residual processing plasticizer content is usually less than 10 percent by weight of the microporous sheet and this may be reduced even further by additional extractions using the same or a different organic extraction liquid. Often the residual processing plasticizer content is less than 5 percent by weight of the microporous sheet and this may be reduced even further by additional extractions.

On a coating-free, printing ink free, impregnant-free, and pre-bonding basis, pores constitute from 35 to 80 percent by volume of the microporous material when made by the above-described process. In many cases the pores constitute from 60 to 75 percent by volume of the microporous material.

The volume average diameter of the pores of the microporous material when made by the above-described process, is usually in the range of from 0.02 to 0.5 micrometer on a coating-free, printing ink-free, impregnant-free, and pre-bonding basis. Frequently the average diameter of the pores is in the range of from 0.04 to 0.3 micrometer. From 0.05 to 0.25 micrometer is preferred.

Microporous material may also be produced according to the general principles and procedures of U.S. Pat. Nos. 2,772,322; 3,696,061; and/or 3,862,030. These principles and procedures are particularly applicable where the polymer of the matrix is or is predominately poly(vinyl chloride) or a copolymer containing a large proportion of polymerized vinyl chloride.

The microporous material produced by the above-described processes may optionally be stretched. It will be appreciated that the stretching both increases the void volume of the material and induces regions of molecular orientation. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation.

Stretching may be accomplished in a single step or a plurality of steps as desired. For example, when the microporous material is to be stretched in a single direction (uniaxial stretching), the stretching may be accomplished by a single stretching step or a sequence of stretching steps until the desired final stretch ratio is attained. Similarly, when the microporous material is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the microporous material is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Stretched microporous material may be produced by stretching the unstretched microporous material in at least one stretching direction above the elastic limit. Usually the stretch ratio is at least 1.5. In many cases the stretch ratio is at least 1.7. Preferably it is at least 2. Frequently the stretch ratio is in the range of from 1.5 to 15. Often the stretch ratio is in the range of from 1.7 to 10. Preferably the stretch ratio is in the range of from 2 to 6. As used herein, the stretch ratio is determined by the formula:

$$S = L_2 L_1$$

where S is the stretch ratio, $L_1$ is the distance between two reference points located on the unstretched microporous material and on a line parallel to the stretching direction, and $L_2$ is the distance between the same two reference points located on the stretched microporous material.

The temperatures at which stretching is accomplished may vary widely. Stretching may be accomplished at ambient room temperature, but usually elevated temperatures are employed. In most cases, the film surface temperatures during stretching are in the range of from 20° C. to 220° C. Often such temperatures are in the range of from 50° C. to 200° C. From 75° C. to 180° C. is preferred.

Various types of stretching apparatus are well known and may be used to accomplish stretching of the microporous material.

After stretching has been accomplished, the microporous material may optionally be sintered, annealed, heat set and/or otherwise heat treated. During these optional steps, the stretched microporous material is usually held under tension so that it will not markedly shrink at the elevated temperatures employed, although some relaxation amounting to a small fraction of the maximum stretch ratio is frequently permitted.

Following stretching and any heat treatments employed, tension is released from the stretched microporous material after the microporous material has been brought to a temperature at which, except for a small amount of elastic recovery amounting to a small fraction of the stretch ratio, it is substantially dimensionally stable in the absence of tension. Elastic recovery under these conditions usually does not amount to more than 10 percent of the stretch ratio.

Stretching is preferably accomplished after substantial removal of the processing plasticizer as described above. For purposes of this invention, however, the calendered sheet may be stretched in at least one stretching direction followed by substantial removal of the residual organic extraction liquid. It will be appreciated that as stretching may be accomplished in a single step or a plurality of steps, so likewise extraction of the processing plasticizer may be accomplished in a single step or a plurality of steps and removal of the residual organic extraction liquid may be accomplished in a single step or a plurality of steps. The various combinations of the steps stretching, partial stretching, processing plasticizer extraction, partial plasticizer extraction, removal of organic extraction liquid, and partial removal of organic extraction liquid are very numerous, and may be accomplished in any order, provided of course, that a step of processing plasticizer extraction (partial or substantially complete) precedes the first step of residual organic extraction liquid removal (partial or substantially complete). It is expected that varying the orders and numbers of these steps will produce variations in a least some of the physical properties of the stretched microporous product.

In all cases, the porosity of the stretched microporous material is, unless coated, printed, impregnated, or bonded after stretching, greater than that of the unstretched microporous material. On a coating-free, printing ink-free, impregnant-free, and pre-bonding basis, pores usually constitute more than 80 percent by volume of the stretched microporous material. In many instances the pores constitute at least 85 percent by volume of the stretched microporous material. Often the pores constitute from more than 80 percent to 95 percent by volume of the stretched microporous material. From 85 percent to 95 percent by volume is preferred.

Generally on a coating-free, printing ink-free, impregnant-free, and pre-bonding basis the volume average diameter of the pores of the stretched microporous material is in the range of from 0.6 to 50 micrometers. Very often the volume average diameter of the pores is in the range of from 1 to 40 micrometers. From 2 to 30 micrometers is preferred.

The microporous material of the invention, whether stretched or unstretched, may be prepared by including whiteness retaining organic surface active agent in the ingredients used to form the microporous material or whiteness retaining organic surface active agent may be applied topically, as for example by spraying, dipping, roll coating, or the like, to previously formed microporous material (i.e., microporous material containing no whiteness retaining organic surface active agent). Whiteness retaining organic surface active agents are compounds containing both hydrophobic and hydrophilic groups or regions in the molecule. Such surface active agents may be cationic, nonionic, anionic, or amphoteric. The whiteness retaining organic surface active agents have the ability to reduce, retard, or eliminate timewise discolorations such as darkening, browning, yellowing, or the like. They are often, but not necessarily antistats. Examples of suitable whiteness retaining organic surfactive agents include N,N-bis(2-hydroxyethyl-)cocoamide, octyl-dimethyl-2-hydroxyethyl quaternary methane sulfonate, octyl-dimethyl-2-hydroxyethyl quaternary dodecylbenzene sulfonate, soya dimethyl ethyl ammonium ethosulfate, polyethyleneglycol (400) monolaurate, stearamidopropyldimethyl-2-hydroxyethylammonium nitrate, dimethyl cocobenzalkonium chloride, and lauramine oxide. One whiteness retaining organic surface active agent or a mixture of whiteness retaining organic surface active agents may be used as desired.

When the whiteness retaining organic surface active agent is an integral component of the microporous material (i.e., it is included in the various materials which are used to form the microporous material), it usually constitutes from 0.1 to 10 percent by weight of the microporous material. Often the whiteness retaining organic surface active agent constitutes from 0.2 to 5 percent by weight of the microporous material. From 0.5 to 2.5 percent by weight of the microporous material is preferred.

When the whiteness retaining organic surface active agent is topically applied whiteness retaining organic surface active agent, it usually constitutes from 0.05 to 10 percent by weight of the microporous material of the invention. Often the topically applied whiteness retaining organic surface active agent constitutes from 0.1 to 5 percent by weight of the microporous material. From 0.2 to 2.5 percent by weight of the microporous material is preferred.

The microporous material of the invention may optionally be coated, impregnated, and/or printed with a wide variety of coating compositions, impregnating compositions, and/or printing inks using a wide variety of coating, impregnating, and/or printing processes. The coating compositions, coating processes, impregnating compositions, impregnation processes, printing inks, and printing processes are themselves conventional. The printing, impregnation, and coating of microporous material are more fully described in U.S. Pat. Nos. 4,861,644; 5,032,450; and 5,047,283.

The invention is further described in conjunction with the following examples which are to be considered illustrative rather than limiting.

Preparation of Two Roll Mill Samples:

Laboratory samples were prepared by mixing together the ingredients listed in Table 2. Numbers in parentheses refer to the footnotes which appear at the end of Table 2. All solids were weighed into a glass beaker and then the indicated amount of processing oil was added. The materials were blended with a spatula to form a paste. The paste was preheated to 105° C. in an air oven for from 30 to 90 minutes.

Sheet samples were prepared on a C. W. Brabender Prep Mill, Type PM-3000, two-roll laboratory mill using 170° C. roll temperature, a 0.96 millimeter gap, and a drive speed of 20 revolutions per minute. The warmed paste was added to the nip of the mill. For the mixtures of some examples a slower drive speed was used initially to facilitate early mixing of the ingredients. The polyethylenes were allowed to melt and the mixture was consolidated to a uniform sheet with a rolling bank. The sample was mixed by making cuts from one side to one-half to three-quarters across the sheet and folding the trailing flap back onto the uncut portion. Further cuts were made alternating from the edge from which the initial cut was made and the trailing flap was folded back onto the uncut portion. After the sample was mixed, the mill speed was slowed to 10 revolutions per minute and allowed to run for a short while in order to minimize any orientation effects caused by the mill. The slow speed also aided in removing the sheet from the mill. The mill was stopped. The sheet on the mill roll was cut near the nip entrance, a 2 to 3 centimeter flap was loosened from the roll and held on a piece of paper towel. The mill was restarted and the sheet was removed as one continuous piece. The sheet sample was placed on a stainless steel covered stone bench top to cool.

A portion of the oil-filled sheet was pressed to approximately 250 micrometers thickness in a 30 ton Carver hydraulic press with 30.5 centimeter×30.5 centimeter heated platens. Eight to twelve grams of oil-filled sample was placed on a 30.5 centimeter×30.5 centimeter piece of 125 micrometer thick aluminum foil in the center of a 250 micrometer thick frame with an opening about 23 centimeters×23 centimeters. A second piece of foil was placed over the sample in the frame and the "mold" was placed in the press which had been preheated to 186° C. The platens were closed to touch the sample without applying force and the sample was preheated for 3 minutes. The force was then raised to load of 178 kilonewtons and maintained for 1 minute. The mold was removed from the press and cooled with the sample by placing on a stone bench top. The pressed sample was removed from the foil mold and a circle 175 millimeters in diameter was cut from the pressed sheet.

The process oil was extracted by soaking the circular sheet in about 500 milliliters of 60° C. trichloroethylene in a 190 millimeter×100 millimeter crystallizing dish for 2 minutes. The sample was rapidly removed from the trichloroethylene bath and held by two forceps in steam vapor above one liter of boiling water in a two-liter beaker for one minute. The sample was removed from the steam vapor and allowed to air dry for a minimum of 3 hours in a fume hood. The formulations and results of extractable sodium testing are shown in Table 2.

TABLE 2

| Example No. | 1 | 2 |
|---|---|---|
| UHMWPE (1), g | 6.60 | 6.60 |
| HDPE (2), g | 8.07 | 8.07 |
| Silica (3), g | 29.33 | 0 |
| Silica (4), g | 0 | 29.33 |
| TiO$_2$ (5), g | 0.93 | 0.93 |
| Antioxidant (6), g | 0.15 | 0.15 |
| Lubricant (7), g | 0.47 | 0.47 |
| Process Oil (8), g | 66.00 | 66.00 |
| Extractable sodium, mmol/kg | 17.8 | 23.8 |

Notes:
(1) UHMWPE = Ultra High Molecular Weight Polyethylene, GUR 413, Hoechst-Celanese Corp.
(2) HDPE = Hostalen ® GM9255HS High Density Polyethylene, Fina.
(3) Hi-Sil ® 927 Precipitated Silica, PPG Industries, Inc. (63 mmol/kg sodium; 3.2 mmol/kg sulfur; 57.8 mmol/kg aluminum).
(4) Hi-Sil ® 928 Precipitated Silica, PPG Industries, Inc. (56 mmol/kg sodium; 5.1 mmol/kg sulfur; 46.7 mmol/kg aluminum).
(5) TiO$_2$ = Ti-Pure ® R-960 Titanium Dioxide, DuPont.
(6) Irganox ® 1010, Ciba-Geigy Corp.
(7) Petrac ® CZ-81, Synpro Corp.
(8) ArcoPRIME ® 400, Lyondell Petroleum Corp.

Although the present invention has been described with reference to specific details of certain embodiments thereof, it is not intended that such details should be regarded as limitations upon the scope of the invention except insofar as they are included in the accompanying claims.

We claim:

1. In microporous material which on a coating-free, printing ink-free, impregnant-free basis and pre-bonding basis comprises:

(a) a matrix consisting essentially of substantially water insoluble thermoplastic organic polymer, (b) finely divided substantially water-insoluble filler particles, of which at least 50 percent by weight are amorphous precipitated silica particles, said filler particles being distributed throughout said matrix and constituting from 40 to 90 percent by weight of said microporous material, and (c) a network of interconnecting pores communicating substantially throughout said microporous material, the pores constituting from 35 to 95 percent by volume of said microporous material, the improvement wherein said microporous material is characterized by an extractable alkali metal content of less than 50 millimoles per kilogram of said microporous material.

2. The microporous material of claim 1 wherein said microporous material is characterized by an extractable alkali metal content of less than 35 millimoles per kilogram of said microporous material.

3. The microporous material of claim 1 wherein said microporous material is characterized by an extractable alkali metal content of less than 20 millimoles per kilogram of said microporous material.

4. The microporous material of claim 1 wherein said amorphous precipitated silica particles constitute at least 65 percent by weight of said finely divided substantially water-insoluble filler particles.

5. The microporous material of claim 1 wherein said amorphous precipitated silica particles constitute at least 75 percent by weight of said finely divided substantially water-insoluble filler particles.

6. The microporous material of claim 1 wherein said amorphous precipitated silica particles constitute at least 85 percent by weight of said finely divided substantially water-insoluble filler particles.

7. The microporous material of claim 1 wherein all of said finely divided substantially water-insoluble filler particles are said amorphous precipitated silica particles.

8. The microporous material of claim 1 wherein said filler particles constitute from 40 percent to 85 percent by weight of said microporous material.

9. The microporous material of claim 1 wherein said filler particles constitute from 55 percent to 80 percent by weight of said microporous material.

10. The microporous material of claim 1 wherein said substantially water-insoluble thermoplastic organic polymer comprises substantially linear ultrahigh molecular weight polyolefin which is substantially linear ultrahigh molecular weight polyethylene having an intrinsic viscosity of at least 10 deciliters/gram, substantially linear ultrahigh molecular weight polypropylene having an intrinsic viscosity of at least 6 deciliters/gram, or a mixture thereof.

11. The microporous material of claim 10 wherein said substantially linear ultrahigh molecular weight polyolefin is substantially linear ultrahigh molecular weight polyethylene having an intrinsic viscosity of at least 18 deciliters/gram.

12. The microporous material of claim 1 wherein said matrix comprises a mixture of substantially linear ultrahigh molecular weight polyethylene having an intrinsic viscosity of at least 10 deciliters/gram and lower molecular weight polyethylene having an ASTM D 1238-86 Condition E melt index of less than 50 grams/10 minutes and an ASTM D 1238-86 Condition F melt index of at least 0.1 gram/10 minutes.

13. The microporous material of claim 12 wherein said substantially linear ultrahigh molecular weight polyethylene constitutes at least one percent by weight of said matrix and said substantially linear ultrahigh molecular weight polyethylene and said lower molecular weight polyethylene together constitute substantially 100 percent by weight of the polymer of said matrix.

14. The microporous material of claim 13 wherein said lower molecular weight polyethylene is high density polyethylene.

15. The microporous material of claim 1 wherein said amorphous precipitated silica particles constitute at least 85 percent by weight of said finely divided substantially water-insoluble filler particles.

16. The microporous material of claim 15 wherein said filler particles constitute from 40 percent to 85 percent by weight of said microporous material.

17. The microporous material of claim 15 wherein all of said finely divided substantially water-insoluble filler particles are said amorphous precipitated silica particles.

* * * * *

UNITED STATES PATENT AND TRADEMARK OFFICE
CERTIFICATE OF CORRECTION

PATENT NO. : 5,583,171
DATED : December 10, 1996
INVENTOR(S) : Richard A. Schwarz et al It is certified that error appears in the above-identified patent and that said Letters Patent is hereby corrected as shown below:

Column 11, line 33, formula

"$S = L_2L_1$"   should be --$S = L_2/L_1$--.

Signed and Sealed this

Fifth Day of May, 1998

*Attest:*

BRUCE LEHMAN

*Attesting Officer*          *Commissioner of Patents and Trademarks*